United States Patent
Kasahara et al.

[11] 3,884,545
[45] May 20, 1975

[54] METHOD OF ELIMINATING GAPS BETWEEN THE EXIT PUPILS OF SUPERIMPOSED FOCUSED-IMAGE HOLOGRAMS

[75] Inventors: Tadashi Kasahara; Yoshiaki Kimura; Masanori Kawai, all of Tokyo, Japan

[73] Assignee: Konishiroku Photo Industry Co., Ltd., Tokyo, Japan

[22] Filed: May 11, 1972

[21] Appl. No.: 252,438

[52] U.S. Cl. .................................................. 350/3.5
[51] Int. Cl. .......................................... G02b 27/00
[58] Field of Search ................................... 350/3.5

[56] References Cited
UNITED STATES PATENTS

| | | | |
|---|---|---|---|
| 2,833,176 | 5/1958 | Ossoinak | 350/3.5 |
| 3,515,452 | 6/1970 | Pole | 350/3.5 |
| 3,633,989 | 1/1972 | Benton | 350/3.5 |
| 3,695,744 | 10/1972 | Clay | 350/3.5 |

Primary Examiner—Ronald J. Stern
Attorney, Agent, or Firm—Sughrue, Rothwell, Mion, Zinn and Macpeak

[57] ABSTRACT

In one embodiment, a very sharp three-dimensional image of an object is produced by first recording on a sheet of photosensitive material several images of an object as viewed from several different points corresponding to the centers of the individual lenses in an array of lenses. Then, reference light from an extended light source is used to convert the recorded images into an image hologram. Finally, the hologram is illuminated by white light to produce in space a very sharp three-dimensional image which is free of dead spaces corresponding to the spaces between the individual lenses of the lens array.

5 Claims, 16 Drawing Figures

METHOD OF ELIMINATING GAPS BETWEEN THE EXIT PUPILS OF SUPERIMPOSED FOCUSED-IMAGE HOLOGRAMS

BACKGROUND OF THE INVENTION

1. Field of the Invention

This invention relates to a method of reproducing images, and more specifically to a method of reproducing images in a three-dimensional way so that an object illuminated by incoherent light is reproduced as a three-dimensional image.

2. Description of the Prior Art

It has been conventionally known in the art to reproduce images in a three-dimensional way by use of a fly's eye lens. Such reproduction systems for reproducing an image of an object illuminated by incoherent light are known as integral photography and the holocoder hologram method.

In integral photography, a number of images of an object viewed from different viewing points are recorded on a photosensitive material through a fly's eye lens in a first step, and in a second step a photosensitive material on which the images are reversed into positive images through a photographic method is located exactly at the original position with respect to the fly's eye lens and illuminated from the backside by white light to obtain a three dimensional reproduction of an image of the object.

In the holocoder hologram method, a number of images of an object viewed from different viewing points are recorded on a photosensitive material through a fly's eye lens in a first step; in a second step, a photosensitive material on which the images are reversed into positive images is located exactly at the original position with respect to the fly's eye lens and is illuminated by laser light from the backside to form a hologram on a photosensitive material placed in front of the fly's eye lens in cooperation with a reference light having a coherent relation with the illuminating light and coming from an oblique direction; and in a third step, the hologram is illuminated by coherent reproduction light conjugate with the reference light to form a three dimensional reproduction image of the object, which image can be viewed from points in the vicinity of the real image of the fly's eye lens.

Both in integral photography and in the holocoder hologram method, a fly's eye lens is used. Since the fly's eye lens used is made of plastic and consists of a number of single lenses of small size arranged in side by side relationship, the performance of the respective lens elements is far from the high performance of photographic lenses. Further, because of expansion and contraction of the plastic, the image focusing performance of the plastic fly's eye lens is not stable and is of low grade.

Since the images are formed through such lenses of low performance in the integral photography and holocoder hologram methods, it is impossible to obtain a reproduction image of high resolving power. Further, since the respective images are required to be formed in the respective image forming areas of the small lenses and there is a limit in the spaces between the lenses of the fly's eye lens, the area for recording the image is limited to an extremely small one, and accordingly it is impossible to obtain an image of high quality when using a photosensitive material of low resolution, such as a color film. In the holocoder hologram method, it is necessary to use laser light for reproducing the hologram. In the case where laser light is used for the reproduction, a granular pattern of high contrast, a so-called speckle pattern, is superposed on the image reproduced, and the image is considerably deteriorated thereby.

In order to obtain a three dimensional image of high quality, the respective images recorded and projected by the respective small single lenses should have sufficiently high sharpness. In order to obtain images of high sharpness, the lens system must be composed of at least two or three pieces of lenses. In the case where a composite lens is used, the lens should be mounted in a lens frame. Therefore, it is impossible to cover the whole observation window with a lens surface without a dead space. Further, in order to improve the sharpness of the recorded images, it is necessary that the area of the photosensitive material for recording the respective images should be fairly large, thereby requiring large separation between the optical axes of the respective lenses; accordingly, dead spaces are formed between apertures if the diameter of the apertures of the lenses is shorter than the distance between the optical axes.

SUMMARY OF THE INVENTION

The first object of the present invention is to provide an image reproduction method in which a three dimensional image of high sharpness and faithfulness is obtained by use of a method similar to the holocoder hologram method combined with the image hologram method.

The second object of the present invention is to provide an image reproduction method in which a three dimensional image of high faithfulness is obtained through image information recorded by way of a comparatively small number of viewing points when recording a three dimensional image of an object by utilizing the characteristics of an image hologram.

The third object of the present invention is to provide an image reproduction method in which a scene viewed from a comparatively smaller number of viewing points is reprojected as a plane image, and each image is recorded on a photosensitive material as an image hologram. The image holograms corresponding to the different viewing points are superposed on the photosensitive material and are reproduced by incoherent light to obtain a three dimensional image of high quality without speckle noise.

The fourth object of the present invention is to provide an image reproduction method in which image information obtained from different viewing points are recorded as color-separated images, and color-separated image information is recorded in coherent superposition on a sheet of photosensitive material as a multi-image hologram, and then the respective color-separated information images are recorded in incoherent superposition on the photosensitive material for the respective colors to obtain a colored three dimensional image.

The fifth object of the present invention is to provide an image reproduction method in which image information obtained from different viewing points is recorded on a color film in incoherent superpositions as a multi-image hologram by means of laser lights of several wavelengths to obtain a colored three dimensional image.

The sixth object of the present invention is to provide an image reproduction method in which a moving object is reproduced in three dimmensions by acquiring pictorial information of a moving object through a number of photographic lenses which are arranged simultaneously to view the object from different viewing points.

The seventh object of the present invention is to provide an image reproduction method in which an object's image can be made into a three dimensional color image by using the output display device of an electronic computer in cooperation therewith and by using a shutter successively operated for a number of arranged photographic lenses or using the composite of a photographic lens and a movable mask.

The eighth object of the present invention is to provide an image reproduction method in which dead spaces, appearing at the time of reproduction of the image and being due to the spaces between the plurality of lenses used for recording the images, are eliminated to facilitate the observation of the reproduced image.

In order to accomplish the above described objects, it is essential that the sharpness of the images recorded from the respective viewing points be high. In the present invention, accordingly, a lens array consisting of a plurality of units of composite lenses having as high a performance as that of a photographic lens is substituted for the conventional fly's eye lens, and the resulting dead spaces are eliminated by use of an extended reference light source and/or an extended illuminating light source for image reproduction. Further, in the present invention, the reproduction of images by incoherent light is enabled by utlizing the characteristics of an image hologram.

In brief summary, the present invention provides an image reproduction method comprising the following three steps.

In the first step of the present invention, image information obtained from a number of different viewing points is recorded on a sheet of photosensitive material in a manner similar to integral photography. The optical system used in this step, however, is not a fly's eye lens, but a lens array consisting of a number of composite lenses arranged in a matrix and having high performance with aberration sufficiently corrected. In the second step of the present invention, the images obtained through a number of lenses are converted into an image hologram. In the third step, a reproduced image is obtained by use of white light illumination, and then a remarkably high quality image can be reproduced in a three dimensional way without dead spaces between the apertures.

A feature of the present invention is that the dead spaces between the lenses are eliminated by using reference light emitted by an extended light source to convert images into an image hologram in the second step and using illuminating light emitted by a point light source or an extended light source in the third step, or by using reference light emitted by a point source to convert the image into an image hologram and using illuminating light emitted by an extended light source.

The present invention has the following advantages:

1. Being able to provide a three dimensional image which has much higher sharpness than the images obtained through the conventional integral photography and the holocoder hologram method, owing to the high resolving power of the lenses used.

2. Being able to observe the reproduced image from any point in the range of the observation window since there is no dead space.

3. Being able to reproduce a colored three dimensional image by white light sources combined with filters.

4. Being able to obtain a three dimensional image of high sharpness without speckle noise such as appears when coherent light, like laser light, is used for illumination.

5. Being able to reproduce an image which has the same colors as the original even when only one kind of coherent light is used at the time of recording.

6. Being able to vary the color balance of the reproduced image at will just by properly selecting some primary colors.

7. Being able to obtain a bright reproduced image since white light is employed for reproducing the image, and to obtain a sharp image reproduction owing to the characteristics of the image hologram.

8. Being able to obtain easily a three dimensional image reproduction of an imaginary object.

9. Being able to obtain a three dimensional reproduction of a moving object.

Now a detailed explanation as to a method of elimination dead spaces between apertures in the vicinity of the original position of the lens array at the time of reproducing the hologram in the third step of the present invention will be made hereinbelow, and further other details concerning the steps of the present invention will now be made explicit from the following description of the preferred embodiments thereof taken in conjunction with the accompanying drawings.

DESCRIPTION OF THE PREFERRED EMBODIMENTS

Figure 1:
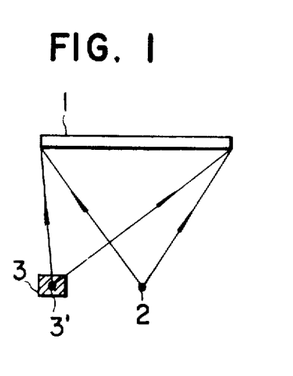
FIG. 1 is a schematic plan view showing the arrangement of the hologram forming system wherein a point light source is used as an object and an extended light source is used for the reference light.

Referring first to FIG. 1, a method of eliminating the dead space will be described for the case in which a point light source is used as an object and an extended light source is used as a reference light. The reference numeral 1 indicates a photosensitive material for holography, 2 indicates a point light source as an object to be reproduced, and 3 indicates an extended light source used as a reference light and having a center 3'. It is well known in the art that a real image of the point light source 2 can be reproduced by placing its hologram recorder on the photosensitive material 1 by the arrangement as shown in FIG. 1 in the same position at which the recording occurred, and then illuminating the hologram with coherent light having a wave front conjugate with the reference light.

Figure 2:
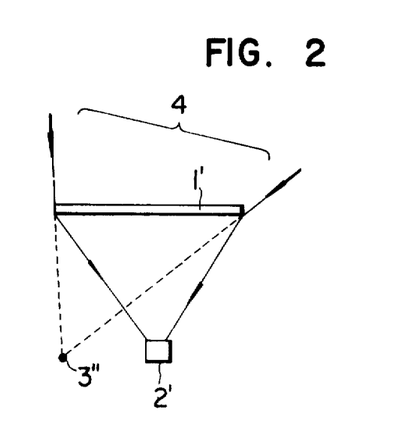
FIG. 2 is a plan view showing the principle of the method for eliminating the dead space at a position in the vicinity of the original position of the lens array at the time of reproducing the image in the third step in the present invention.

FIG. 2 shows the principle of the method of eliminating the dead space between apertures in the vicinity of the original lens array at the time of reproducing a three dimensional image in the third step of the present invention. The reference numeral 1' shows a hologram made by the arrangement shown in FIG. 1, the numerals 2' and 3'' show respectively the positions corresponding to the positions 2 and 3' in FIG. 1, and the reference numeral 4 indicates laser light for illumination of the hologram.

From an image formation formula holography, it can be shown that a real image which is analogous to the extended distribution of the reference laser light source is formed at an object point 2' if the hologram 1' made by the arrangement as shown in FIG. 1 is illuminated by laser light 4 concentrated to a point 3'' as shown in FIG. 2.

In general, if a hologram 1', made by the arrangement as shown in FIG. 1 and by reference light source having an extended distribution, of which the rectangular configuration shown in the FIG. 1 is an example, is illuminated by a light bundle concentrated to a point 3'' as shown in FIG. 2, a real image which is analogous to the extended distribution of the reference light source is formed around object point 2'. Further, if the hologram is illuminated by light bundle concentrated to any extended distribution around a point 3'' for reproduction, a real image having the convoluted distribution of the extended distribution of the reference light source and the extended distribution of the reproduction light is formed. Furthermore, if a hologram is formed using a point light source as reference light in FIG. 1 and if a light bundle forming a rectangular image around the point 3'' is used as the illumination light for reproduction in FIG. 2, then a square real image analogous to the distribution of the illumination light is formed around the object point 2'.

Figure 3:
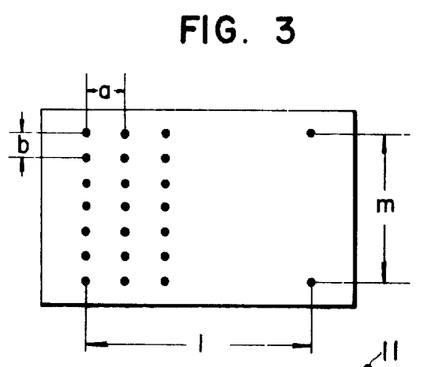
FIG. 3 is a front view showing the matrix arrangement of a number of point light sources.

Now assuming that, instead of the point light source 2 as an object in FIG. 1, there is employed, as shown in FIG. 3, a point light source array having a number $l$ of point sources arranged laterally at equal intervals of $a$ and a number $m$ of point sources arranged vertically at equal intervals of $b$, and assuming that this point source array is holographically recorded on photosensitive material 1 by use of reference light emitted from an extended light source 3 having a rectangular distribution around the point 3' which resembles a rectangle with a base $a$ and an altitude $b$ long, then a rectangular image reproduction with a base of length $la$ and an altitude of length $mb$ is obtained when the photographically treated hologram is placed at exactly the original recording position with respect to the reference light source 3 and is illuminated by coherent light concentrated or focused at the point 3''. In this reproduction, the respective rectangular distributions correspond to the respective point sources of the array and, consequently, the small distributions are gathered into a large distribution of the reproduction. In this reproduction step, an extended light source may be used as a reproduction light source.

In the case where the arrangement of the point light sources is different from that shown in FIG. 3, the extended distribution of the light sources for the reference light should be changed according to the arrangement of the point light sources so as to obtain a large distribution of the reproduction image.

Figure 4:
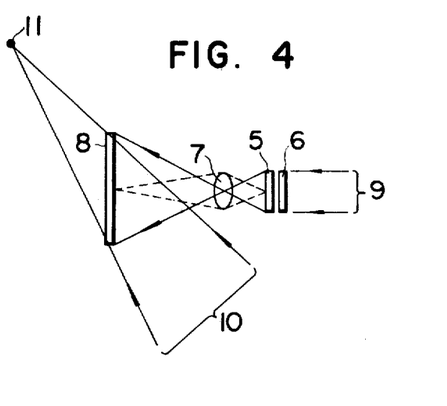
FIG. 4 is a schematic side view showing an optical system for recording a two dimensional image as an image hologram.

Now a case will be considered wherein a point light source including a two dimensional image information is used as the object in FIG. 1 and the two dimensional image is recorded on a photosensitive material 1 as an image hologram. First, there will be explained with reference to FIG. 4 the method of forming an image hologram of a plane image. In FIG. 4, the reference numeral 5 indicates a two dimensional image, 6 shows a diffused plate, 7 shows a projection lens, 8 shows a photosensitive material for holography, 9 shows laser light for illumination, 10 shows laser light for the reference light, and 11 shows the position of a point to which the reference laser light is focused or concentrated. The diffused plate 6 located behind the two dimensional image 5 is illuminated by laser light 9, the photosensitive material 8 is placed at a focusing position relative to the projection lens 7 which projects thereon the two dimensional image 5, and the image hologram of the two dimensional image is recorded on the photosensitive material by concentrating to the point 11 an object light (the iris of the lens may be regarded as the object) including the image information interfered with the reference light 10.

Figure 5:
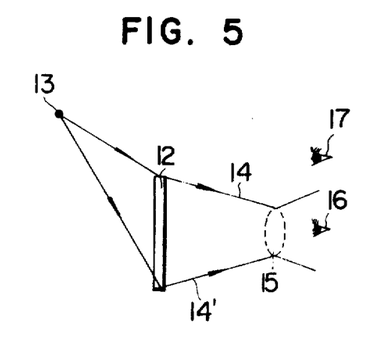
FIG. 5 is a side view showing an optical system for reproducing the image hologram made by the optical system shown in FIG. 4.

Referring to FIG. 5 showing an arrangement for reproducing images from the image hologram recorded on the photosensitive material 8, the reference numeral 12 indicates an image hologram made by photographically treating the photosensitive material 8, 13 shows a position from which white light is emitted, 14 and 14' show diffracted light from the hologram, 15 shows a real image of the projection lens 7, and 16 and 17 show positions of viewing points, and the numeral 16 indicating viewing point from which the reproduced image can be observed and 17 indicating a viewing point from which the image cannot be observed. If the image hologram 12 is illuminated by white light emitted from the point 13, a real image 15 of the projection lens 7 is formed by the light 14 and 14' diffracted through the hologram 12. From the viewing point 16 in the lens aperture, the whole two dimensional image can be observed. From the viewing point 17 out of the lens aperture, however, the reproduction of the two dimensional image cannot be seen.

Now assuming that a number of two dimensional images are used as the object and a group of corresponding projection lenses is used for projecting the image of the object, real images of the lens apertures are reproduced by illuminating an image hologram, recorded by an optical system similar to that shown in FIG. 4, by use of an optical system as shown in FIG. 5, and the two dimensional image corresponding to that projected by one lens can be observed as a real image from a viewing point in one of the lens apertures. However from the viewing points in the spaces between the lens apertures where the diffracted light is not received, the two dimensional image cannot be observed. In other words, in this case, dead spaces are formed. However, if a light source having an extended distribution corresponding to the shape of the lens apertures and the lens array is used as the reference light source, the real images of the respective lens apertures of the lens array are changed to real images of proper shape (e.g., rectangle) and size, and the dead spaces can be eliminated according to the same principle as that of the foregoing method of changing the reproduced image of the lens array of point light sources into a plane distribution of the reproduced image. Consequently, it becomes possible to see at least one of the two dimensional images in a certain range (corresponding to the lens array surface employed at the time of recording the two dimensional images) regardless of the position of the viewing point.

It will be apparent from the foregoing description of the principle of the method of eliminating dead spaces that the dead spaces between the lens apertures can be eliminated when an extended light source is used as the reproducing illumination source. In this case, the reference light source may be either a point light source or an extended light source.

The present invention can be divided into the following five methods of forming images. In other words, there are five typical embodiments in the method of reproducing three dimensional images in accordance with the present invention. The five embodiments of the present invention will first be summarized, and thereafter, they will be described in detail referring to the accompanying drawings.

In the first embodiment, a lens array consisting of lenses having as high a performance as that of a photographic lens is prepared, and image information observed from viewing points corresponding to the centers of the respective lens apertures is recorded on a photosensitive material through the lens array in a first step, and in a second step, the photosensitive material photographically processed into a positive is placed at the same position relative to the lens array as that in the recording step and is illuminated by coherent light from the back to project the image information for the respective viewing points onto a focal plane in front of the lens array where a photosensitive material is placed for the recording thereon of an image hologram in cooperation with a reference light coherent with the illumination emitted from light sources having an extended distribution corresponding to the lens array, and in a third step, the hologram is illuminated by an incoherent point light source or an extended incoherent light source to reproduce the image information, as viewed from the respective viewing points, in the same space as that in which the original lens array existed with high faithfulness and without dead spaces between the lens apertures, whereby a three dimensional image is reproduced.

In the second embodiment of the present invention, a lens array having as high a performance as that of a photographic lens is prepared; and through this lens array color separated images of the object viewed from a number of viewing points corresponding to the centers of the respective lens apertures of the lens array are recorded on a plurality of black and white photosensitive materials in a first step; and in a second step, one of the photosensitive materials photographically processed into a positive is placed at the same position relative to the lens array as that in the recording step and is illuminated by coherent light from the back to project the image information of the different viewing points onto a focal plane in front of the lens array where a photosensitive material is placed for the recording thereon of an image hologram in cooperation with a reference light coherent with the illumination emitted from light sources having an extended distribution corresponding to the lens array, and, further, other positive images of different colors are successively placed at the position where the first positive image was placed, and the image holograms thereof are superposed on the photosensitive material while changing the incident angle of the reference light; and finally in the third step, the image hologram is illuminated by a plurality of light sources from different directions through a plurality of color filters, wherein the light sources are incoherent point light sources or extended light sources, to obtain a colored three dimensional image of high faithfulness and visible from various viewing points without dead spaces between the lens apertures and at a position corresponding to the original lens array.

In the third embodiment of the present invention, a lens array having as high a performance as that of the photographic lens is prepared and through this lens array image information of the object viewed from a number of viewing points is recorded on a color photosensitive material in a first step; and in a second step, the photosensitive material photographically processed into positive is placed at the same position relative to the lens array as that at the time of recording and is illuminated from the back by coherent light having a number of wavelength components to project the image information of the different viewing points onto a focal plane in front of the lens array where a photosensitive material is placed to record thereon several kinds of color separated images as a superposed image hologram in cooperation with a plurality of coherent reference lights having different wavelengths, emitted from light sources having extended distribution corresponding to the lens array, and incident to the hologram from different directions; and finally in the third step the image hologram is illuminated by a plurality of light sources, consisting of color filters and incoherent point or extended light sources, from different directions to obtain a colored three dimensional image having high faithfulness visible from various different viewing points and having no dead space between apertures at a position corresponding to the original lens array.

In the fourth embodiment of the present invention, in a first step, a number of images from different viewing points and corresponding to images viewed from the respective lens apertures in a lens array are formed on an output display device of an electronic computer and are recorded on a photosensitive material placed behind a lens array which is located in front of the display device to focus the images on the display device onto the photosensitive material by opening shutters one by one; and the second and third steps, which are the same as those in the first, second and third embodiments of the present invention, are carried out to obtain a three dimensional image.

In the fifth embodiment of the present invention, in a first step a number of images from different viewing points corresponding to images viewed from the respective lens apertures in a lens array are formed on an output display device of an electronic computer and are recorded on a photosensitive material placed behind a light intercepting mask which is located movably in front of the display device together with a lens and a shutter; and the second and third steps, which are the same as those in the first, second and third embodiments of the present invention, are carried out to produce a three dimensional image of the image on the display device.

Now the several embodiments for carrying out the present invention will be described in detail referring to the drawing.

First Embodiment

The first embodiment of the invention relates to a general method of reproducing a three dimensional image and will be described with reference to FIGS. 6 to 8.

Figures 6, 7, 8, 10:
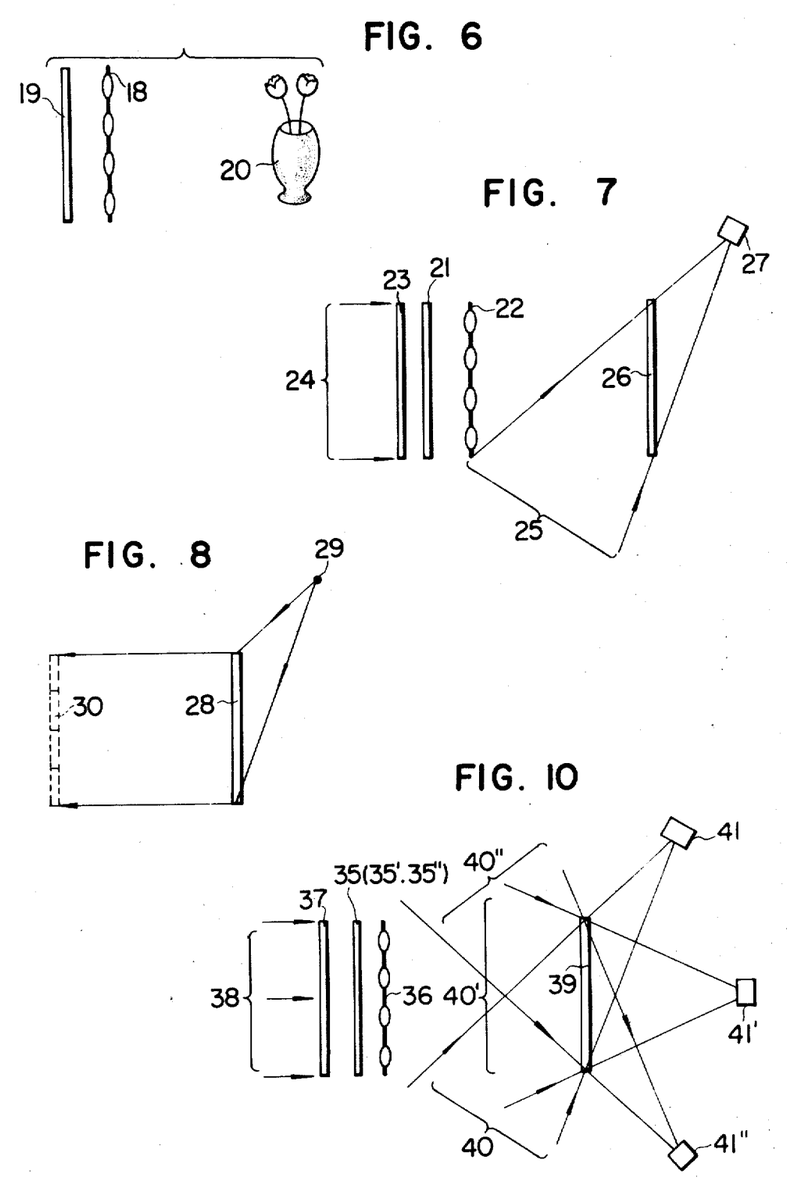
FIG. 6 is an explanatory side view showing the first step of the first embodiment of the present invention.
FIG. 7 is a side view showing the second step of the first embodiment of the present invention.
FIG. 8 is a side view showing the third step of the first embodiment of the present invention.
FIG. 10 is a side view showing the second step of the second embodiment of the present invention.

FIG. 6 shows an optical system for recording a number of images which have different viewing points in the first step of the invention. The reference numeral 18 indicates a lens array, 19 indicates a photosensitive material, and 20 indicates an object whose image is to be recorded and reproduced. The lens array 18 consists of a number of lenses arranged in a matrix of $l$ lenses arranged horizontally at intervals of $a$ and $m$ lenses arranged vertically at intervals of $b$.

Through this lens array 18, information of the object 20 viewed from viewing points corresponding to the lens aperture positions of the respective lenses of the lens array 18 is recorded on the photosensitive material 19.

FIG. 7 shows an optical system for recording a number of images from different viewing points as an image hologram in the second step of the invention. The reference numeral 21 shows a positive image obtained by reversing the image recorded in the first step. If a positive type photosensitive material is used in the first step to make a positive image, the process for reversing the image can be eliminated. Reference numeral 22 shows a lens array having the same performance as that used in the first step, 23 shows a diffused plate, 24 shows illumination laser light, 25 shows reference laser light, 26 shows a photosensitive material for holography, and 27 shows a distribution formed by the reference laser light 25 and having a definite size defined by the length-width ratio of $b/a$.

When the positive image 21 is placed at the same position as that at the time of recording in relation to the lens array 22, and the diffused plate 23 located behind the positive image 21 is illuminated by the illumination laser light 24, then the image information of the different viewing points is projected on a focal plane in front of the lens after passing through the lens array 22. A photosensitive material 26 is placed in the focal plane, and an image hologram is formed thereon by making the superposed image information, including the $l \times m$ images superposed in two dimensions, interfere with the coherent reference laser light 25 concentrated to the distribution area 27.

FIG. 8 shows an optical system for observing a three dimensional image without a dead space in the third step of the first embodiment, wherein the reference numeral 28 shows an image hologram obtained in the second step, 29 shows a white light point source for illumination or a white light source having a proper extended distribution, and 30 shows a real image of the lens array 22.

When the image hologram 28 is illuminated by the white light source 29 located at the relatively same position as that of the concentrated distribution of the reference light 27 at the time of recording, a rectangular distribution having a size of $a \times b$ is reproduced at the position of each real image of each lens aperture of the lens array 30. Accordingly, if the hologram is observed from the position in the vicinity of the real image 30, a three dimensional image can be observed without a dead space in the region of a rectangular space having the size of $la \times mb$, and, if the observer moves, the three dimensional image can be seen from a different viewing point according to the movement of the viewing point of the observer.

Second Embodiment

The second embodiment of the present invention relates to a method of obtaining a colored three dimensional image in which a number of images of an object from different viewing points are color separated and recorded on a black and white photosensitive material, converted by the use of a monochromatic laser light into an image hologram having superposed holograms, and then the image hologram is illuminated by a light source having a combination of a white light source and a filter.

Figure 9:
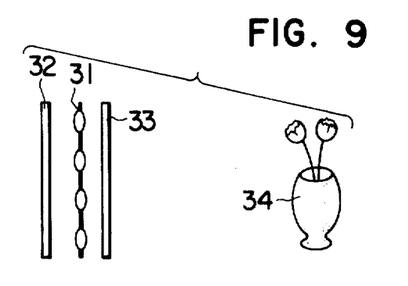
FIG. 9 is an explanatory side view showing the first step of the second embodiment of the present invention in which a three dimensional color image is formed by way of color image information recorded on black and white photosensitive materials by a tricolor separation method.

FIG. 9 shows an optical system for recording a number of images from different viewing points in the first step of the second embodiment of the invention, wherein the reference numeral 31 shows a lens array having $l$ number of lenses arranged horizontally at intervals of $a$ and $m$ lenses arranged vertically at intervals of $b$, and having as high a performance as that of a photographic lens. 32 shows a black and white photosensitive material, 33 shows a color filter, and 34 shows an object to be recorded and reproduced. In this arrangement, the color filter 33 is changed from red to blue to green, and the photosensitive material 32 is also changed according to the filter change to record color separated images of the object 34 viewed from the viewing points corresponding to the respective lenses of the lens array 31.

FIG. 10 shows an optical system for recording the image obtained in the second step of the second embodiment as an image hologram wherein the reference numerals 35, 35', 35'' show positive images corresponding to images from different viewing points and recorded through the red, blue and green filters in the first step. 36 shows a lens array having the same performance as that of the lens array used to record the object in the first step, 37 shows a diffused plate, 38 shows illumination laser light, 39 shows a photosensitive material for holograph, 40, 40' and 40'' show reference laser lights in which 40' shows laser light advancing from this side of the drawing sheet to the back side thereof in FIG. 10. 41, 41' and 41'' show the concentrating positions of reference laser lights 40, 40' and 40'', each position having an extended distribution defined by a rectangular space having a length-width ratio of $b/a$.

One of the positive images 35 from one of the different viewing points and obtained in the first step is located at the same position as that at the time of recording in relation to the lens array 36, and the diffused plate 37 is placed behind the image illuminated by the illumination light 38. Then, the information in the positive image 35 is projected on a focal plane through the lens array 36. In this focal plane, a photosensitive material 39 for holography is placed to form an image hologram by making the superposed image information, including the $l \times m$ viewing point images superposed in two dimensions, interfere with a coherent reference laser light 40 concentrated to the distribution area 41. Thereafter, the image 35 is successively changed to the images 35' and 35'' and image holograms are successively recorded by the use of the reference laser lights 40', 40'' concentrating to the distribution areas 41' and 41'', respectively. Thus, three kinds of image holograms are superposed on the photosensitive material 39.

Figure 11:
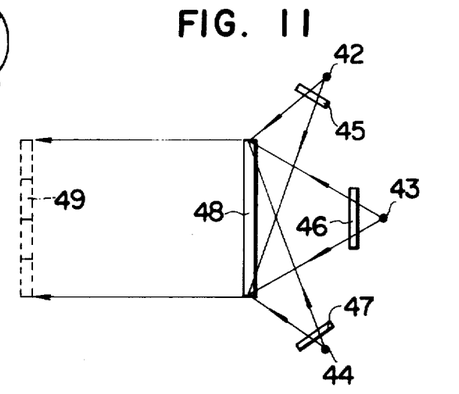
FIG. 11 is a side view showing the third step of the second embodiment of the present invention.

FIG. 11 shows an optical system for observing a colored three dimensional image without a dead space in the third step of the second embodiment. In FIG. 11, the reference numerals 42, 43 and 44 show white light point sources or extended white light sources, respectively; 45, 46 and 47 show red, blue and green filters, respectively; 48 shows an image hologram obtained in the second step, and 49 shows the position of the real image of the lens array.

The light sources 42, 43 and 44 with the red, blue and green filters 45, 46 and 47 are located at substantially the same positions in relation to the image hologram 48 obtained in the second step as those of the distributions 41, 41' and 41'' of the reference light used in the second step, and the image hologram 48 is illuminated by the light sources 42, 43 and 44 through the color filters 45, 46 and 47 to reproduce the real images of the lens array in different color and superposed at the position 49. Since extended light sources are used as the reference light and the rectangular distributions of size of $a \times b$ correspond to the respective lenses of the lens array, no dead space can be seen from the viewing points at 49 in the three dimensional color image in the range of $la \times mb$. The positions of the white light sources relative to the image hologram in the third step are determined as follows. There is a relationship between the average incident angle $\theta$ of the reference laser light (wavelength $\lambda$) to the hologram in the second step and the incident angle $\theta'$ of the reproducing illumination light (wavelength $\lambda'$) to the hologram in the third step as follows:

$$\sin \theta' = \lambda'/\lambda \sin \theta \qquad (1)$$

It is assumed here that the object light is incident to the surface of the hologram at substantially a right angle and that the diffracted light is also directed at substantially a right angle to the surface of the hologram. In order that the real images of the lens array reproduced in the third step are in coincidence with the original lens array, it is required to determine the positions of the white light sources 42, 43 and 44 so as to satisfy the formula (1) according to the wavelength of transmitted light of the color filters 45, 46 and 47.

Third Embodiment

The third embodiment relates to a method of reproducing a colored three dimensional image in which a tricolor laser light is used in the process of converting an image into an image hologram, and a color photosensitive material is used in recording a number of images from different viewing points.

Figure 12:
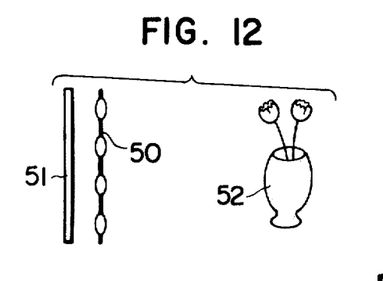
FIG. 12 is an explanatory side view showing the first step of the third embodiment of the present invention in which a three dimensional color image is formed by way of color image information recorded on a color photosensitive material.

FIG. 12 shows an optical system for recording a number of images of different viewing points in the first step of the third embodiment, wherein the reference numeral 50 shows a lens array having $l$ lenses arranged horizontally at intervals of $a$, and $m$ lenses arranged vertically at intervals of $b$ and having as high a performance as that of a photographic lens. 51 shows a color photosensitive material, and 52 shows an object to be recorded and reproduced.

In this arrangement, a number of images of the object 52 from different viewing points corresponding to the lens apertures of the lens array 50 are recorded on the color photosensitive material 51.

Figure 13:
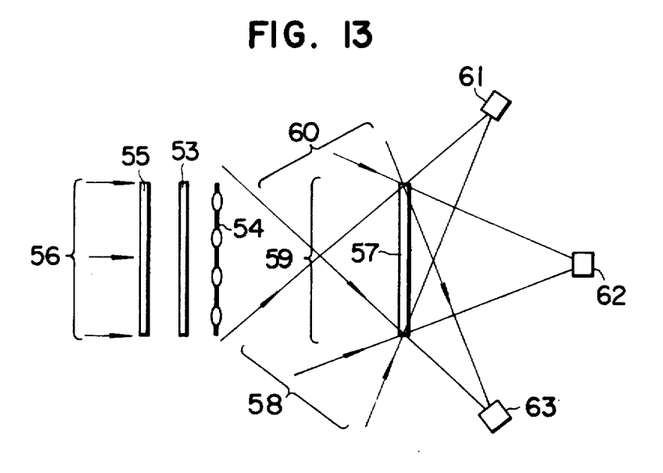
FIG. 13 is a side view showing the second step of the third embodiment of the present invention.

FIG. 13 shows an optical system for converting the color images obtained in the first step into an image hologram in the second step of the third embodiment of the invention, wherein the reference numeral 53 shows a positive image made from the color photosensitive material 51 in FIG. 12, 54 shows a lens array having the same performance as that of the lens array used for taking images of the object in the first step, 55 shows a diffused plate, 56 shows illumination laser light containing red, blue and green wavelength components, 57 shows a photosensitive material for holography, and 58, 59 and 60 show reference laser lights of red, blue and green, respectively, which lights are coherent to the respective components of the illumination laser light. The reference numerals 61, 62 and 63 show concentrated positions of reference laser lights 58, 59 and 60, respectively, and having extended distributions defined by a rectangular space with a length-width ratio of $b/a$. The color image 53 is positive, is in the same position in relation to the lens array 54 as that of the lens array at the time of recording, and is illuminated by illumination laser light 56 having components of red, blue and green through a diffused plate 55 located behind the positive image 53. Thus, the images of different viewing points are projected on a focal plane in front of the lens, where the photosensitive material 57 is placed, and three kinds of image holograms are superposed thereon by causing the $l \times m$ viewing point images superposed in two dimensions to interfere with the reference laser lights 58, 59 and 60 of red, blue and green which are concentrated to the definite distribution spaces 61, 62 and 63, respectively.

Figure 14:
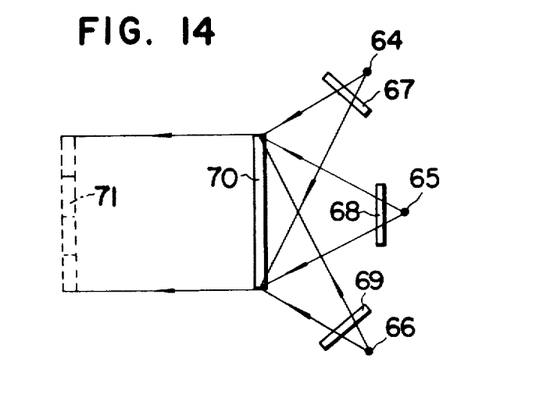
FIG. 14 is a side view showing the third step of the third embodiment of the present invention.

FIG. 14 shows an optical system for observing a colored three dimensional image without dead space in the third step of the third embodiment of the invention.

In FIG. 14, the reference numerals 64, 65 and 66 show white light point sources or properly extended white light sources; 67, 68 and 69 show red, blue and green color filters; 70 shows an image hologram obtained in the second step; and 71 shows the position of the real image of the lens array.

White light sources 64, 65 and 66 with the red, blue and green color filters 67, 68 and 69 are arranged at the same relative positions to the image hologram 70 obtained in the second step as those of the concentrated distributions 61, 62 and 63 of the reference light used in the second step, and the image hologram 70 is illuminated by the light sources 64, 65 and 66 through the color filters 67, 68 and 69 to reproduce a superposed image of the three colored real images of the lens array at the position 71. Since extended light sources are used as the reference light and the rectangular distributions of size $a \times b$ correspond to the respective lenses of the lens array, no dead space can be seen in the three dimensional color image from the viewing points at position 71 within the range of $la \times mb$.

Fourth Embodiment

The fourth embodiment relates to a method of reproducing a three dimensional image of an imaginary object.

Figure 15:
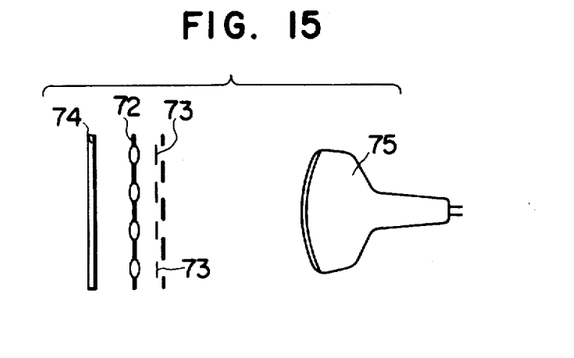
FIG. 15 is an explanatory side view showing the first step of the fourth embodiment of the present invention in which an image of an imaginary object is reproduced in three dimensions.

FIG. 15 shows an optical system for recording images from different viewing points in the first step of the fourth embodiment, wherein the reference numeral 72 shows a lens array having $l$ lenses arranged horizontally at intervals of $a$ and $m$ lenses arranged vertically at intervals of $b$ and having as high a performance as that of a photographic lens. 73 shows a shutter for opening and closing the lens apertures of the respective lenses in the lens array, 74 shows a photosensitive material, and 75 shows a display device (e.g., CRT) for displaying an output of an electronic computer.

In the arrangement as shown in FIG. 15, a plane image of an imaginary object viewed from a viewing point corresponding to a lens in the lens array 72 is displayed on the display device 75 (e.g., CRT) as an output of an electronic computer, and the shutter 73 of the lens corresponding to that viewing point is opened to record the corresponding image on the photosensitive material 74. This operation is repeated for all the lenses in the lens array 72 to obtain a number of images of the imaginary object corresponding to the different viewing points. The second and the third steps of the fourth embodiment are the same as those adopted in the first embodiment. By this fourth embodiment, a three dimensional image of an imaginary object is reproduced with a dead space.

It will be understood that the produced image of the imaginary object can be easily colored by applying the second and third embodiment of the invention to this fourth embodiment.

Fifth Embodiment

Figure 16:
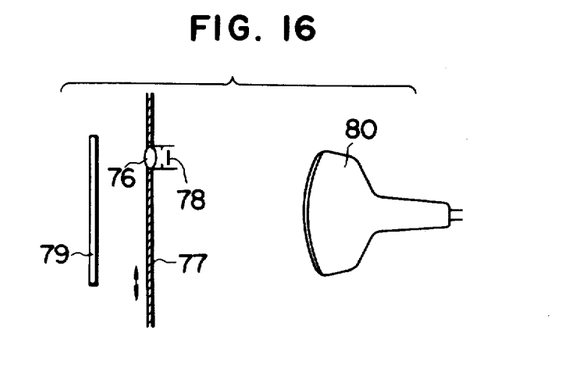
FIG. 16 is an explanatory side view showing the first step of the fifth embodiment of the present invention in which an image of an imaginary object is formed in three dimensions.

The fifth embodiment of the invention relate to a method of reproducing a three dimensional image of an imaginary object like the fourth embodiment. FIG. 16 shows an optical system for recording a number of images of different viewing points in the first step of the fifth embodiment, wherein the reference numeral 76 shows a lens having as high a performance as that of a photographic lens. 77 shows a light intercepting mask, 78 shows a shutter, 79 shows a photosensitive material, and 80 shows a display device (e.g., CRT) for displaying an output of an electronic computer. The lens 76 and the shutter 78 are provided on the light intercepting mask 77 which is movable to the right and left and up and down.

In the arrangement as shown in FIG. 16, a plane image of an imaginary object viewed from a viewing point corresponding to a certain position of the lens 76 is displayed on the display device 80 as an output of an electronic computer, the lens 76 with the shutter 77 is moved to the viewing point, and the shutter 78 is opened to record the image on the photosensitive material 79. This recording process is conducted for a number of viewing points. In this operation, it is necessary to select the positions of the viewing points so that the images recorded on the photosensitive material 79 may not be superimposed with each other.

The second and third steps of the fifth embodiment are the same as those adopted in the first embodiment. Further, the lens array used in this embodiment should be made so that the lenses thereof correspond to the positions of the viewing points selected in the first step.

In the fifth embodiment, it is also possible to observe the three dimensional image of an imaginary object without a dead space. Further, it will be readily understood that the reproduced image of the imaginary object can be colored by applying the method shown in the second and third embodiments.

In the above described embodiments, the arrangement of the lenses in the lens array has been described to be composed of lenses arranged in a matrix having $l$ lenses in the horizontal direction and $m$ lenses in the vertical direction. This is, however, just one example for simplifying the description, and accordingly may be varied or modified without limitation.

In putting the present invention into practice, the F-number and intervals of the lenses should be taken into consideration so that the images formed through the lenses are not overlapped on the photosensitive material. The overlapping of the images can be easily obviated by other considerations, such as provision of a lens barrel or a stop.

It will also be readily understood that more than three colors can be used for obtaining a color image of higher faithfulness, although the second and third embodiments have been described with a color separation system using three colors of red, blue and green.

While the invention has been particularly shown and described with reference to four embodiments thereof, it will be understood by those skilled in the art that various changes in form and details may be made therein without departing from the spirit and scope of the invention.

What is claimed is:

1. A method of reproducing a three dimensional image comprising:
    a first step of recording a plurality of focused-image holograms by placing between a photosensitive recording material and an array of first images of an object a lens array consisting of a plurality of multi-element photographic lenses mounted in an opaque mask in a uniform array such that the apertures of said lenses are uniformly spaced apart, each of said first images representing a different directional view of the object corresponding to the position of the image in the array of images, each of said lenses being disposed to form on said recording material a focused image of its corresponding first image, and illuminating said first images with coherent light and said photosensitive material with mutually coherent reference light, whereby said first images are recorded on said photosensitive recording material as an image hologram; and a second step of reproducing said first images by illuminating said image hologram with incoherent light; wherein the uniform spacing between lenses is such as to define for each lens an area in which the lens is centered, each area being contiguous to those of adjacent lenses, the areas all having the same shape and size; and wherein one of said reference light in the first step and said incoherent light in the second step appears to come from a point source and the other appears to come from an extended source having a shape substantially identical to said shape of said area.

2. A method of reproducing a three dimensional image according to claim 1, wherein each of said first images is one color separation image of a set of color separation images, each color separation image in said set being recorded on a different black and white photosensitive material, said step of recording a plurality of focused-image holograms is repeated for each other color separation image in said set using the same photosensitive recording material and using reference light formed into a beam having a different direction for each color separation image in said set so as to form a composite hologram comprising superposed image holograms, and further comprising emitting said incoherent illuminating light in the second step as plurality of light beams having the same respective directions relative to said hologram as said different directions.

3. A method of reproducing a three dimensional image according to claim 1, wherein said images are color images recorded on a color photosensitive material, said coherent illuminating light in the first step comprises a plurality of different wavelength components, said reference light comprises the same plurality of different wavelength components, respectively, coherent to said illuminating light components and emitted from respectively different directions relative to said hologram, and said illuminating light in the second step comprises the same wavelength components having the same respective different directions relative to said hologram.

4. A method of reproducing a three dimensional image according to claim 1, wherein said first images are the images of an imaginary object formed by an electronic computer.

5. A method of reproducing a three dimensional image as defined in claim 4 wherein said first images are sequentially presented as a display on the output of the electronic computer and are recorded as said array of first images on a second photosensitive recording material by placing between the display and said second photosensitive material a single multi-element photographic lens mounted in an opaque mask with a shutter between said lens and said display, and recording the sequentially displayed first images on different areas of said second photosensitive material by sequentially moving said lens and shutter to different positions corresponding respectively to the different displayed images and opening said shutter at each position.

* * * * *